United States Patent [19]

Varvil

[11] 4,335,157
[45] Jun. 15, 1982

[54] FLUID SHORTENING

[75] Inventor: R. Douglas Varvil, Olmsted Falls, Ohio

[73] Assignee: SCM Corporation, New York, N.Y.

[21] Appl. No.: 175,432

[22] Filed: Aug. 5, 1980

[51] Int. Cl.³ .......................... A21D 2/16; A23D 5/02
[52] U.S. Cl. .................................... 426/606; 426/653; 426/24
[58] Field of Search .................. 426/24, 606, 612, 653

[56] References Cited

U.S. PATENT DOCUMENTS

| | | | |
|---|---|---|---|
| 3,433,645 | 3/1969 | Egan et al. | 426/24 |
| 3,528,823 | 9/1970 | Rossen | 426/606 |
| 3,549,383 | 12/1970 | Menzies | 426/606 X |
| 3,615,681 | 10/1971 | DuRoss et al. | 426/24 |
| 3,767,822 | 10/1973 | Oszlanyi et al. | 426/24 |
| 3,857,985 | 12/1974 | Reid et al. | 426/606 |
| 3,943,259 | 3/1976 | Norris | 426/24 |
| 4,234,606 | 11/1980 | Gawrilow | 426/606 X |

FOREIGN PATENT DOCUMENTS

| | | | |
|---|---|---|---|
| 561704 | 8/1958 | Canada | 426/24 |
| 664047 | 1/1952 | United Kingdom | 426/24 |

*Primary Examiner*—Robert A. Yoncoskie
*Attorney, Agent, or Firm*—Richard H. Thomas

[57] ABSTRACT

A stabilized fluid shortening containing conditioning and softening agents, comprises about 4 to 10 weight parts of a soft or hard mono- and diglyceride, about 2 to about 8 weight parts of fatty acid ester polyglycerol, about 2 to about 8 weight parts of solid beta-phase crystalline food emulsifier component and about 40 to 100 weight parts liquid vegetable oil, wherein the fluid shortening is a stabilized dispersion obtained by shock cooling a blend of the shortening ingredients to a temperature in the range of about 75°–105° F., and agitating such blend in this temperature range for a period sufficient to obtain substantially complete crystal conversion to the beta-polymorphic form.

6 Claims, No Drawings

FLUID SHORTENING

The present invention relates to a fluid shortening, particularly a fluid shortening useful in the preparation of yeast-raised goods, such as yeast-raised baked and fried goods, and to methods for making the same.

BACKGROUND OF THE INVENTION

Fluid shortenings are useful in the preparation of baked goods and in bread-making processes. The function of fluid shortenings is similar to the function of plastic shortenings in baking processes, but fluid shortenings are much preferred for use in commercial processes due to ease of handling, pumping, and metering. Such fluid shortenings characteristically are fluid at temperatures of about 60° F. to 100° F. and should not become unstable in storage over this temperature range, or in use, by separation into distinct liquid and liquids-solid phases. They should have a stabilized fluid consistency wherein the viscosity remains relatively constant over a wide temperature range.

In commercial baking operations, loaves of bread are subjected to many mechanical shocks which have a deleterious effect on the volume of the loaf; that is, the finished product. Thus, it has been conventional practice in bread making, on a commercial scale, to have in the shortening composition, certain components broadly classed as "dough conditioners" whose function is to minimize the effects of mechanical shocks on the final loaf volume.

In prior Pat. No. 3,914,452, assigned to assignees of the present application, there is disclosed a fluid shortening containing about 4 to 14 weight parts of soft mono- and diglycerides, about 2 to 8 weight parts of ester emulsifier, 0 to about 8 weight parts of solid stearine, and at least about 40 weight parts of liquid vegetable oil. The stabilized fluid shortening is produced by melting a blend of these components at a temperature sufficient to force a melt, votating the blend at temperatures of about 82° F. to about 86° F., and fluidizing or stehling the votated mixture to obtain substantially 100% conversion to the stable betapolymorphic form. The ester emulsifiers are selected from the group consisting of ethoxylated esters of fatty acids, such as polyoxyethylene sorbitan monostearate; lactylates such as sodium stearoyl-2-lactylate; and succinylated monoglycerides. It is indicated in the patent that the preferred ester emulsifiers are ethoxylated glycerides comprising mono- and diglycerides, conventionally described as a mixture of stearate, palmitate, and lesser amounts of myristate partial esters of glycerine condensed with approximately 20 moles of ethylene oxide per mole of alpha monoglyceride reaction mixture; such as set forth in The Food Codex and FDA Regulations, and more particularly set forth in Egan Pat. No. 3,433,645.

In prior application Ser. No. 930,746, filed on Aug. 3, 1978, now U.S. Pat. No. 4,234,606, also assigned to assignees of the present application, there is disclosed a different shortening containing, in addition to vegetable oil and mono- and diglyceride, a combination of ester emulsifiers; namely, about 2 to about 8 weight parts of ethoxylated mono- and diglyceride in combination with about 2 to about 8 weight parts of solid, beta-phase crystalline, food emulsifier component selected from the group consisting of an alkali or alkaline earth metal salt of an acyl lactylate, and a succinylated mono- and diglyceride. As with the shortening of the '452 patent, stabilization is effected by producing a melt of a blend of the shortening components, votating the blend at a temperature of about 80° F. to about 90° F., and fluidizing the votated mixture to obtain substantially 100% conversion to the stable beta-polymorphic form. It was found, in accordance with the invention of such prior application, that the solid-phase crystalline food emulsifier component, in the presence of the ethoxylated fatty ester, remained in whole or in part suspended and in solid-phase form in the shortening composition following fluidization. At the same time, the solid-phase crystalline food emulsifier component was beta-forming in the sense that this was the predominate crystal form adopted by such component on rapid chilling of the shortening from a melt form, followed by fluidization.

In both of the above shortenings, an ethoxylated fatty acid ester is a critical ingredient of the shortening. It has now been discovered that ethylene oxide during polymerization can form 1,4-Dioxane as a by-product, which has been shown to be carcinogenic in rats and guinea pigs when administered orally. Therefore, although food grade ethoxylated dough conditioners such as ethoxylated mono- and diglycerides have not been shown to contain 1,4-Dioxane, it seems desirable to replace the ethoxylates with other classes of ingredients which perform the same conditioning functions without the potential risk.

The use of fatty acid esters of polyglycerol in shortenings is not unknown in the art. However, such use has generally been restricted to shortening compositions for stable cream icings and cakes. An example of this application is presented in U.S. Pat. No. 3,549,383, to James H. Menzies, which patent discloses a shortening comprising 80–90% liquid base oil, about 2 to about 10% hard stock, and an emulsifier combination comprising (a) a monoester of glycerol and fatty acid; (b) monoester of polyoxyethylene sorbitan and fatty acid; (c) decaglycerol ester of fatty acid, e.g., decaglycerol triester (Drewpol 10-3-SH, trademark Drew Chemical Corp.); and (d) monoester of propylene glycol and fatty acid. It is indicated in the patent that the decaglycerol ester additive is important to the fluid shortening as an emulsifier for dispersing the shortening in an aqueous phase, for cake-making, and for obtaining improved stability of cream icings. No reference is made in the patent to the use of the shortening in yeast-raised bakery products. The hard stock is defined as a solid triglyceride, what is normally referred to in the art as stearine.

SUMMARY OF THE PRESENT INVENTION

The fluid shortening of the present invention comprises at least about 40 weight parts of a liquid vegetable oil into which is dispersed about 4 to 10 weight parts of a soft or hard mono- and diglyceride, about 2 to 8 weight parts of fatty acid ester of polyglycerol, and about 2 to 8 weight parts of solid beta-phase crytalline food emulsifier component, preferably selected from the group consisting of an alkali or alkaline earth metal salt of an acyl lactylate, and succinylated mono- and diglyceride.

The shortening of the present invention may also contain about 0 to about 3 weight parts of solid stearine, all parts preferably adding to 100. Preferred polyglycerol esters are octaglycerol monoloeate (8-1-O), octaglycerol monostearate (8-1-S), and triglycerol monoshortening (3-1-SH).

The fluid shortening of the present invention preferably contains a ratio of soft or hard mono- and diglycerides to fatty acid esters of polyglycerol in the range of about 60/40 to about 20/80 by weight. The shortening is prepared by stabilization defined as forcing a melt of a blend of the shortening ingredients, rapidly chilling said blend to a temperature in the range of about 75°–105° F., and fluidizing the votated mixture to obtain substantially 100% conversion to the stable beta-polymorphic form.

DETAILED DESCRIPTION OF THE PRESENT INVENTION

The fluid shortening of the present invention is produced from a blend of small amounts of soft or hard mono- and diglyceride, polyglycerol ester emulsifier, and solid beta-phase fine crystalline food emulsifiers, all dispersed in large amounts of liquid vegetable oil to maintain a substantially uniform dispersion.

The soft or hard mono- and diglycerides are essential and generally are a mixture of unsaturated and saturated glycerol esters of fatty acids typically derived from hydrogenated and non-hydrogenated vegetable oils such as soybean oil, corn oil, olive oil, sunflower oil, peanut oil, safflower oil, cottonseed oil, palm oil, and like vegetable oils, and animal fats such as tallow and lard. The ratio of monoglycerides to diglycerides in conventional soft mono- and diglycerides typically is about 40 to 60 weight percent monoglyceride to about 35 to 45 weight percent diglycerides and minor amounts of 5 to 14 percent triglycerides, and such soft mono-, di- and triglyceride mixtures are commercially available. The soft or hard mono- and diglycerides have an iodine value in the broad range of about 0 to 150 and may be prepared from hydrogenated and non-hydrogenated vegetable oils or animal fats. Soft mono- and diglycerides derived from vegetable oils preferably have an iodine number between about 65 to 150, whereas the animal fats preferably have an iodine number of about 40 to 65. The preferred iodine number range of the soft mono- and diglycerides is between about 40 and 85. Soft mono- and diglycerides may be plastic in consistency and typically may have a capillary melting point as high as 130° F. The acid number of soft mono- and diglycerides is less than 2 and the peroxide value thereof should be less than 1, in accordance with conventional specifications of mono- and diglycerides commercially available.

Specific mono- and diglycerides within the scope of the present invention include soft and hard glycerol monoesters. One glycerol monoester useful in the present invention is "Dur-em 114", trademark SCM Corporation, comprising mono- and diglycerides of hydrogenated vegetable oil having an iodine value of 70–80, at least 40% a-monoglyceride, and a capillary melting point of 110°–120° F. This mono- and diglyceride is sold in the form of a cream plastic. Another suitable glycerol monoester useful in the present invention is "Dur-em 204", trademark SCM Corporation, comprising mono- and diglycerides of hydrogenated vegetable oil having an iodine value of 65–75, at least 52% α-monoglyceride, and a capillary melting point of 120°–130° F. This mono- and diglyceride is marketed in the form of a cream plastic.

The fluid shortening of this invention further includes about 2 to about 8 weight parts of fatty acid ester of polyglycerol. These materials are polyglycerol esters formed by polymerizing glycerol and esterifying these polymerized glycerol products with fatty acids or glycerides in a direct esterification or interesterification process to form the polyglycerol ester product. The polyglycerol esters useful in the present invention contain about 2 to about 10 units of glycerol and about 1 to about 10 saturated or unsaturated fatty acid groups per molecule with the fatty acid groups typically derived from corn oil, cottonseed oil, lard, palm oil, peanut oil, safflower oil, sesame oil, sunflower oil, soybean oil, tallow and tall oil, containing from about 16 to about 18 carbon atoms. Suitable methods of forming these esters are disclosed in Harris U.S Pat. No. 2,022,766, and 2,023,388, and in Belgium Pat. No. 623,179 (1963). U.S. Pat. No. 3,637,774 discloses the polymerization of glycerol with an alkaline catalyst, and U.S. Pat. No. 3,968,169 with an acid catalyst. The subject matter of these patents is incorporated by reference herein.

A representative fatty acid ester of polyglycerol is a triglycerol monoester of partially hydrogenated vegetable oil having an iodine value not exceeding about 45 and containing fatty acid groups having from about 16 to about 18 carbon atoms. Such monoesters have been sold commercially under the name "Caprol 3-GVS" (trademark, Stokely Van Camp, Inc.), or under the name Santone 3-1-SH (trademark, SCM Corporation). Another suitable polyglycerol ester which is commercially available is "Santone 8-1O" (trademark, SCM Corporation), an octaglycerol monooleate wherein the substituted fatty acid moiety is primarily oleic acid. This ester has an HLB value of about 13–16, an iodine value of about 25 to 35, a saponification value of about 77 to about 88 and an acid value of about 0 to about 5. Santone 8-1-O is fluid in consistency at ambient temperature.

A fourth suitable polyglycerol ester which is commercially available is "Santone 8-1-S" (trademark, SCM Corporation), an octaglycerol monoester wherein the substituted fatty acid moiety is primarily stearic acid. This ester has an iodine value of about 3 max., a saponification value of about 77 to about 88, an acid value of about 5 max., and a Mettler Dropping Point of about 126°–135° F.

Examples of other polyglycerol esters are triglycerol monostearate (3-1-S), triglycerol mono shortening (3-1-SH), triglycerol monooleate (3-1-O), and hexaglycerol distearate (6-2-S).

The solid-phase crystalline food emulsifier component can be any beta-forming emulsifying ingredient which remains in whole or in part suspended and in solid phase form in the shortening composition of the present invention, in the presence of the polyglycerol ester, in the proportions as defined herein. For purposes of the present application, the term "beta-forming" describes the predominant crystal form adopted by the solid phase component on rapid chilling of the concentrated system from a melt form at an elevated temperature, followed by agitation for a prolonged period of time to develop and maintain a homogeneous dispersion of the desired beta-crystals in the fluid concentrate, in accordance with techniques known in the art.

Examples of functional solid phase fine crystalline food emulsifier components, which are beta-forming, are an alkali or alkaline earth metal salt of an acyl lactylate, or alternatively a succinylated mono- and diglyceride. The fatty acid lactylates and process for their manufacture are described in detail in U.S. Pat. No. 2,733,252, assigned to C. J. Patterson Company. Preferably, these compounds are the acyl lactylates of $C_{14}$–$C_{22}$ fatty acids. The two most common such compounds are sodium and calcium stearoyl-2-lactylate, known as "Emplex" and "Verv" (trademarks) marketed by C. J. Patterson Company. Another example of sodium stearoyl-2-lactylate is "Sodium Marvate", trademark SCM Corporation.

Particular reference can be had to the Food and Drug Administration Regulation Title 21, Section 121.1211 on sodium stearoyl-2-lactylate. This compound is said to be a mixture of sodium salts of stearoyl lactylic acid and minor proportions of other sodium salts of related acids, manufactured by the reaction of stearic acid and lactic acid and conversion to the sodium salt. This emulsifier meets the following specifications:

| Acid Number: | 60–80 |
|---|---|
| Sodium Content: | 3.5%–5% |
| Lactic Acid Content: | 31%–34% |
| Ester Number: | 150–190 |

The manufacture of succinylated mono- and diglycerides is disclosed in U.S. Pat. No. 3,370,958, assigned to National Dairy Products Corporation. They are stated to be a mixture of half succinic acid esters of mono- and diglycerides produced by the succinylation of a product obtained by the glycerolysis of edible fats and oils or by the direct esterification of glycerol with edible fat-forming fatty acids. They have a succinic acid content of 14.8 to 25.6%, a melting point of 50° C. to 60° C. and an acid number of 70-120. Other such beta-forming emulsifiers are succinylated propylene glycol stearate and succinylated sorbitan esters.

The foregoing described soft or hard mono- and diglycerides hereinbefore described and the fatty acid esters of polyglycerol are preferably contained in the fluid shortening in a wide range of a weight ratio of about 80 to 20 weight parts of soft or hard mono- and diglycerides to 20 to 80 weight parts of polyglycerol ester. Preferably, the weight ratio may range from about 60/40 to 20/80 and the most preferred ratio is about 38 weight parts of soft or hard mono- and diglyceride to about 31 weight parts of a fatty acid ester of polyglycerol.

The fluid shortening of this invention further can include minor amounts of solid stearine within the dispersed blend. Stearines useful in this invention are derived from beta-tending fats such as, for example, soybean oil, sunflower oil, peanut oil, safflower oil, and hydrogenated lard. Beta-tending solid stearines may be identified by X-ray diffraction and specto photometry wherein polymorphic forms are identified using a Phillips X-ray Diffraction goniometer coupled with a strip chart recorder. The goniometer has a scanning range of 17.0° to 25.0° and beta-polymorphic forms display identifying peaks at about 19.4°, 23.0°, and 24.0°. The iodine value of solid stearines may range from 0 to 15 and preferably 0 to 5. The capillary melting point of the solid stearines advantageously ranges from 130° to 155° F., and preferably 140° to 145° F. The preferred solid stearine is soybean stearine having an iodine number of about 0 to 5 and derived from hydrogenated soybean oil.

The foregoing components are dispersed within major amounts of liquid vegetable oils, commonly referred to as lipids, and primarily consisting of triglycerides wherein at least about 90 weight percent and preferably about 95 weight percent of the vegetable oil is glycerol esters. Suitable liquid vegetable oils include, for example, soybean oil, peanut oil, mustardseed oil, safflower seed oil, corn oil, sunflower oil and like vegetable oils. Suitable liquid vegetable oils for this invention have an iodine value between about 90 to 150 and preferably 120 to 130. The liquid vegetable oils are liquid at room temperature and preferably have a melting point of less than 50° F. Preferred liquid vegetable oils include soybean oil, sunflower oil, and high oleic safflower seed oil.

In practice, the fluid shortening of this invention is produced by mixing on a weight basis about 4 to 10 weight parts of soft or hard mono- and diglycerides; 2 to 8 weight parts of polyglycerol ester, 2 to 8 weight parts solid beta-phase crystalline food emulsifier, e.g., sodium stearoyl-2-lactylate; and the balance being at least about 40 weight parts of liquid vegetable oil, the total weight parts preferably adding up to 100. The fluid shortening components are heated to a temperature sufficient to liquify all of the components which usually requires temperatures of about 130° to 150° F. whereby a substantially uniform liquid blend results. The liquid blend may then be passed through a swept-surface heat exchanger or other unit for quick chilling to initiate beta-crystal formation. The temperature of the blend is quickly reduced to at least about 105° F., preferably about 80° to 90° F., and maintained at this temperature to exit. A suitable swept-surface heat exchanger for the purpose of this invention is a commercially available Votator A unit, described in detail in U.S. Pat. No. 3,011,896. The Votator A unit causes fat crystals to form and become dispersed within the liquid vegetable oil and further initiates beta-crystal formation. The chilled blend may then be passed to a non-chilled agitator commonly referred to as a Votator B unit for working by agitating the chilled blend to a product of desirable consistency, and to allow beta-crystallization to develop. Maintenance of blend temperatures between 75° F. and 105° F. during cooling and agitation is important due to the varied and multiple melting points of the various components of the fluid shortening. In this regard, the soft or hard mono- and diglycerides have melting points up to about 130° F.; the hard stock solid stearine has a melting point between about 130° and 155° F.; the polyglycerol esters range from liquid at room temperature to melting points (Mettler Dropping Points) up to about 135° F.; the sodium stearoyl-2-lactylate melts between about 135°–145° F; and the liquid vegetable oil usually has a melting point below 50° F. Despite the wide variation in melting points, the process effectively stabilizes and uniformly disperses the emulsifier components within the liquid vegetable oil to provide remarkably stable uniform dispersion. The liquid vegetable oil serves as a continuous-phase matrix for the other components wherein the beta-phase crystalline food emulsifier, e.g. sodium stearoyl-2-lactylate and stearine, if employed, initially crystallize within the liquid vegetable oil matrix upon rapid cooling. Upon further cooling, the soft or hard mono- and diglycerides are believed to associate with the crystallized sodium stearoyl-2-lactylate so as to hold the lactylate suspended within the vegetable oil, the soft mono- and diglycerides having limited affinity for both the oil and the sodium stearoyl-2-lactylate. Further cooling, preferably in the range of about 80° to 90° F. is believed to cause the lower melting point polyglycerol esters as well as additional sodium stearoyl-2-lactylate and soft mono- and diglycerides to become suspended within the matrix of oil.

After processing is completed in the Votator B unit, sometimes referred to as Votation, the resulting uniform dispersion mixture is then passed to an agitated holding tank referred to as a stehling tank for further continuous agitation or fluidization at temperatures still between about 75° F. to 105° F. Fluidization continues for a time sufficient to complete conversion of the fat crystals to the beta-crystal, that is, at least 90 percent conversion and preferably 95 to 100 percent conversion to the beta-crystal form. Fluidization continues for extended periods and up to about 24 hours for diluted dispersion mixtures to form a completely stabilized suspension of predominantly beta-crystals suspended within the liquid vegetable oil matrix to produce the stabilized fluid shortening of this invention. The resulting fluid shortening of this invention has superior stability upon repeated temperature cycling between about 50° F. and 100° F. and maintains the stable dispersion for extended periods.

A further advantageous aspect of this invention is that fluid shortening preferably contains not greater than about 5 percent by volume entrapped air or other gas, thus advantageously prolonging the stability of the fluid shortening. Physical stability is maintained but, even more surprisingly, viscosity characteristics as a function of time and temperature are substantially improved in low gas systems. In a temperature range of 50° F. to 100° F. for example, fluid shortening having a viscosity of about 730 cps and having less than 5 percent entrapped air will possess improved viscosity control over a long period compared to commercial fluid shortening containing greater than 5 percent entrapped air by volume.

The following examples further illustrate the invention but are not to be construed as limiting the scope of the present invention. In the following examples, percentages which are given are weight percentages based on the weight of the entire formulation, unless otherwise stated.

EXAMPLE I

Three fluid shortening formulations were prepared utilizing triglycerol monoshortening (Caprol 3-GVS) as the anti-shock agent according to the following specification:

TABLE I

| Ingredient | Weight Percentage |
| --- | --- |
| Soybean stearine | 0.1 |
| Glyceryl monooleate (Dur-em 204) | 6.0 |
| Sodium steryl-2-lactylate (Emplex) | 4.9 |
| PLUS - | |
| Shortening #1 | |
| Caprol 3-GVS | 2.5 |
| Liquid soybean oil | 86.5 |
| Shortening #2 | |
| Caprol-GVS | 4.9 |
| Liquid soybean oil | 84.1 |
| Shortening #3 | |
| Caprol-GVS | 7.4 |
| Liquid soybean oil | 81.5 |

The ingredients were charged into a holding tank and heated to a temperature of about 140° to 145° F. and agitated at this temperature until a molten mixture was obtained. The molten mixture can then be pumped at a temperature of about 140° F. to a first Votator Unit "A" wherein the mixture is rapidly cooled to a chilled blend at a temperature of approximately 75°-90° F. The mixture may then be pumped, at this temperature, into a Votator "B" Unit where it is agitated to produce a substantially stabilized uniform dispersion. Stabilization of the fluid shortening is then completed by continually agitating the blend at about the same temperature in what is called a stehling tank, at about 16 r.p.m., for a period of about 18-24 hours, resulting in a further stabilized substantially uniform dispersion.

Each of the three shortenings were employed in a bread mix having the following composition:

TABLE II

| Ingredient | Bakers' Percentage |
| --- | --- |
| Water | 65.00 |
| Sugar | 2.00 |
| Salt | 2.00 |
| Brewer's yeast | 3.25 |
| Yeast food | 0.75 |
| Potassium bromate | 66 ppm |
| Potassium iodate | 15 ppm |
| Sodium propionate | 0.10 |
| Spike sugar | 5.00 |
| Nonfat dry milk solids | 2.00 |

Preparation of bread loaves was as follows. Flour was metered into the above formulation by a conveyor system at 100 percent level and the shortening was metered into the same at about 3.0% leve basis flour content. The resulting dough was maintained at 98° to 102° F. and mixed at 132 to 138 revolutions per minute to produce a dough that was optimally developed. The optimally developed dough was extracted into 15.5 ounce samples and placed into standard rectangular load pans measuring 10 inches×5 inches (top) and 9.25 inches×4.25 inches (bottom)×3 inches high. The doughs were allowed to rise to a height of 3.75 inches to produce an expanded loaf.

Three of six loaves produced were subjected to a standard shock test as follows:

A metal roller conveyor was fitted with a metal plate mounted on one end of the conveyor perpendicular to the plate of the conveyor. The metal plate projected approximately 5 inches above the plane of the conveyor so as to form an immovable barrier. The other end of the conveyor was supported so the conveyor formed an angle of 16.5° with the work table. Loaves to be tested were placed on the conveyor in such orientation that the long sides of the conveyor and the leading edge of the pan was at a point 3.0 feet from the arresting plate affixed to the bottom of the conveyor. The loaf pan was then released and allowed to proceed the length of the conveyor propelled by gravity until it struck the arresting plate at the end.

Thereafter, all loaves were baked for 15 minutes at 460° F. and allowed to cool for 60 minutes.

The weight and volume of each loaf was determined. Percentage shock loss was determined by the following equation:

$$\% \text{ shock loss} = \frac{\text{specific volume lost by shocking} \times 100}{\text{unshocked specific volume}}$$

All shock losses as determined were compared to bread prepared utilizing a shortening formula containing no dough conditioners whatsoever.

TABLE III

| Shortening | Percentage Shock Loss |
| --- | --- |
| No dough conditioners | 23.7 |
| Shortening #1 (2.5% Caprol 3GVS) | 12.0 |
| Shortening #2 (4.9% Caprol 3GVS) | 12.0 |
| Shortening #3 (7.4% Caprol 3GVS) | 17.7 |

EXAMPLE II

Three fluid shortening formulations were prepared utilizing octaglycerol monoesters of unsaturated fatty acids (Santone 8-1-O) as the anti-shock agent.

TABLE IV

| Ingredient | Weight Percentage |
| --- | --- |
| Soybean stearine | 0.1 |
| Glyceryl monooleate (Dur-em 204) | 6.0 |
| Sodium steroyl-2-lactylate (Emplex) | 4.9 |
| PLUS- | |
| Shortening #4 | |
| Santone 8-1-O | 2.5 |
| Liquid soybean oil | 86.5 |
| Shortening #5 | |
| Santone 8-1-O | 4.9 |
| Liquid soybean oil | 84.1 |
| Shortening #6 | |
| Santone 8-1-O | 7.4 |
| Liquid soybean oil | 81.5 |

The shortening and bread loaves were produced and tested as in Example I.

TABLE V

| Shortening | Percentage Shock Loss |
| --- | --- |
| No dough conditioners | 23.7 |
| Shortening #4 (2.5% Santone 8-1-O) | 17.7 |
| Shortening #5 (4.9% Santone 8-1-O) | 3.4 |
| Shortening #6 (7.4% Santone 8-1-O) | 10.7 |

EXAMPLE III

Three fluid shortening formulations were prepared utilizing octaglycerol monoesters of saturated fatty acids (Santone 8-1-S) as the anti-shock agent.

TABLE VI

| Ingredient | Weight Percentage |
| --- | --- |
| Soybean stearine | 0.1 |
| Glyceryl monooleate (Dur-em 204) | 6.0 |
| Sodium stearoyl-2-lactylate | 4.9 |
| PLUS- | |
| Shortening #7 | |
| Santone 8-1-S | 2.5 |
| Liquid soybean oil | 86.5 |
| Shortening #8 | |
| Santone 8-1-S | 4.9 |
| Liquid soybean oil | 86.5 |
| Shortening #9 | |
| Santone 8-1-S | 7.4 |
| Liquid soybean oil | 81.5 |

The shortening and bread loaves were prepared and tested as in Example I.

TABLE VII

| Shortening | Percentage Shock Loss |
| --- | --- |
| No dough conditioners | 23.7 |

TABLE VII-continued

| Shortening | Percentage Shock Loss |
| --- | --- |
| Shortening #7 (2.5 Santone 8-1-S) | 10.0 |
| Shortening #8 (4.9 Santone 8-1-S) | 3.2 |
| Shortening #9 (7.4 Santone 8-1-S) | 2.6 |

From the above data it is apparent that the concepts of the present invention provide improved functionality in bread, especially in continuous-mix systems, and particularly with respect to dough conditioning.

The shortening is unique with respect to the prior art in that fatty acid esters of polyglycerol are utilized effectively as dough conditioners in place of various ethoxylated esters which have heretofore been employed for this purpose.

A control shortening employing an ethoxylated monoglyceride in accordance with the teachings of copending application Ser. No. 930,746 (supra), and containing the following ingredients was used in the preparation of bread loaves and tested following the procedures of Example I:

| Ingredients | Weight Percentage |
| --- | --- |
| Soybean Stearine | 0.1 |
| Glycerol Monooleate (Dur-Em 204) | 6.0 |
| Sodium Steroyl-2-Lactylate (Emplex) | 4.9 |
| Ethoxylated Monoglyceride | 4.9 |
| Liquid Soybean Oil | 84.1 |

These loaves exhibited a shock loss of 4.9%.

What is claimed is:

1. A stabilized fluid shortening suitable for dough conditioning havng beta-fat crystals dispersed in liquid vegetable oil, for use in combination with ingredients of a yeast-raised product, comprising
   about 4 to about 10 weight parts of a soft or hard mono- and diglyceride derived from vegetable oil;
   about 2 to about 8 weight parts of fatty acid esters of polyglycerol
   about 2 to about 8 weight parts of a solid beta-phase fine crystalline food emulsifier component; and
   about 40 to about 100 weight parts of liquid vegetable oil, wherein said soft or hard mono- and diglycerides, said fatty acid esters of polyglycerol; said solid beta-phase crystalline food emulsifier component, and said liquid vegetable oil are dispersed by heating to form a liquified molten mixture followed by quick chilling to about 75° to 105° F. and fluidization to form beta-fat crystals and a stabilized substantially uniform dispersion within said liquid vegetable oil; said fatty acid ester of polyglycerol being selected from the group consisting of octaglycerol monooleate and octaglycerol monostearate.

2. The shortening of claim 1, wherein said solid beta-phase crystalline food emulsifier component is selected from the group consisting of an alkali or alkaline earth metal salt of a acyl lactylate and a succinylated mono- and diglyceride.

3. The shortening of claim 1, wherein said soft or hard mono- and diglyceride has an iodine value of about 0 to about 150.

4. The shortening of claims 1, 2, or 3 in yeast-raised products.

5. The shortening of claim 1 including the use of high-stress mixing during quick chilling.

6. The shortening of claims 1, 2, or 3 containing about 0–3% stearine.

* * * * *